US011321102B2

(12) United States Patent
Nagata

(10) Patent No.: US 11,321,102 B2
(45) Date of Patent: May 3, 2022

(54) PROGRAMMABLE DISPLAY, DISPLAY CONTROL METHOD, AND DISPLAY CONTROL PROGRAM

(71) Applicant: OMRON Corporation, Kyoto (JP)

(72) Inventor: Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 670 days.

(21) Appl. No.: 15/814,417

(22) Filed: Nov. 16, 2017

(65) Prior Publication Data
US 2018/0232243 A1 Aug. 16, 2018

(30) Foreign Application Priority Data

Feb. 10, 2017 (JP) .............................. JP2017-023204

(51) Int. Cl.
G06F 9/44 (2018.01)
G06F 11/34 (2006.01)
(Continued)

(52) U.S. Cl.
CPC ............. *G06F 9/451* (2018.02); *G05B 19/05* (2013.01); *G05B 23/0267* (2013.01);
(Continued)

(58) Field of Classification Search
CPC .... G06F 9/451; G06F 11/327; G06F 11/3495; G05B 23/0267; G05B 19/05; G05B 2219/13144; G05B 19/4186; G06N 20/00
See application file for complete search history.

(56) References Cited

U.S. PATENT DOCUMENTS 8,954,521 B1\* 2/2015 Faaborg ................. H04L 51/32
709/206
2006/0031716 A1\* 2/2006 Chen ................... G06F 11/2284
714/36
(Continued)

FOREIGN PATENT DOCUMENTS

CN 102077580 5/2011
CN 103443725 12/2013
(Continued)

OTHER PUBLICATIONS

"Search Report of Europe Counterpart Application", dated Jun. 21, 2018, p. 1-p. 8.
(Continued)

Primary Examiner — Jennifer N Welch
Assistant Examiner — Parmanand D Patel
(74) Attorney, Agent, or Firm — JCIPRNET

(57) ABSTRACT

To provide a programmable display that enables content for coping with an event that has occurred to be promptly used. A programmable display that can communicate with a control device that controls production equipment includes a display; a storage device that stores a plurality of pieces of content that can be used by the programmable display; a detection part that detects a predetermined event that occurs in the production equipment; a learning part that learns a probability that each of 5 the plurality of pieces of content will be used under a condition that the predetermined event occurs by monitoring content used by the programmable display when the predetermined event is detected; and a specification part that specifies content having a high possibility of being used by the programmable display among the plurality of pieces of content based on the learned probability when the predetermined event is detected.

8 Claims, 13 Drawing Sheets

(51) Int. Cl.
  *G06F 11/32*   (2006.01)
  *G05B 19/05*   (2006.01)
  *G06F 9/451*   (2018.01)
  *G06N 20/00*   (2019.01)
  *G05B 23/02*   (2006.01)

(52) U.S. Cl.
  CPC ........ *G06F 11/327* (2013.01); *G06F 11/3495* (2013.01); *G06N 20/00* (2019.01); *G05B 2219/13144* (2013.01)

(56) References Cited

U.S. PATENT DOCUMENTS

| | | | |
|---|---|---|---|
| 2008/0217108 A1* | 9/2008 | Curt | G06Q 20/208 186/61 |
| 2009/0132095 A1* | 5/2009 | Sekiai | G05B 13/027 700/286 |
| 2010/0070907 A1* | 3/2010 | Harrod | G06F 8/34 700/277 |
| 2010/0082125 A1 | 4/2010 | Pingel et al. | |
| 2013/0297049 A1 | 11/2013 | Morita | |
| 2016/0342906 A1* | 11/2016 | Shaashua | H04L 67/12 |
| 2017/0178012 A1* | 6/2017 | Borza | G06F 12/0862 |
| 2017/0276426 A1* | 9/2017 | Jung | F25D 29/00 |
| 2018/0063276 A1* | 3/2018 | Foged | H04L 67/02 |

FOREIGN PATENT DOCUMENTS

| | | | |
|---|---|---|---|
| CN | 103676755 | 3/2014 | |
| CN | 104937511 | 9/2015 | |
| EP | 2853968 | 4/2015 | |
| EP | 2853968 A1 * | 4/2015 | ......... G05B 23/0272 |
| JP | H01199212 | 8/1989 | |
| JP | H02201506 | 8/1990 | |
| JP | H10254531 | 9/1998 | |
| JP | H1139022 | 2/1999 | |
| JP | 2005062978 | 3/2005 | |
| JP | 2006293611 | 10/2006 | |
| JP | 2008539490 | 11/2008 | |
| JP | 2013064770 | 4/2013 | |
| JP | 2014211837 | 11/2014 | |
| JP | 2016-506559 | 3/2016 | |
| JP | 2016134137 | 7/2016 | |
| JP | 2016197368 | 11/2016 | |
| JP | 2016197368 A * | 11/2016 | |
| WO | 9746936 | 12/1997 | |

OTHER PUBLICATIONS

"Office Action of Europe Counterpart Application", dated Feb. 27, 2019, p. 1-p. 5.

"Office Action of China Counterpart Application", dated May 27, 2020, with English translation, p. 1-p. 17.

"Office Action of Japan Counterpart Application", dated Oct. 20, 2020, with English translation thereof, pp. 1-7.

Office Action of Japan Counterpart Application, with English translation thereof, dated Apr. 6, 2021, pp. 1-9.

* cited by examiner

PROGRAMMABLE DISPLAY, DISPLAY CONTROL METHOD, AND DISPLAY CONTROL PROGRAM

CROSS-REFERENCE TO RELATED APPLICATION

This application claims the priority benefit of Japanese application serial no. 2017-023204, filed on Feb. 10, 2017. The entirety of the above-mentioned patent application is hereby incorporated by reference herein and made a part of this specification.

BACKGROUND

Technical Field

The disclosure relates to a technology for controlling screens of a programmable display that can communicate with a control device that controls equipment.

Description of Related Art

Control devices such as programmable logic controllers (PLCs) have been introduced in various manufacturing fields. PLCs control a variety of production equipment used in manufacturing fields in compliance with control programs that are designed in accordance with manufacturing devices and manufacturing facilities. Operation instructions for such PLCs are realized through programmable displays such as human-machine interfaces (HMIs) that are configured to be capable of communicating with the PLCs.

Operators working in manufacturing fields can remotely operate various kinds of production equipment by operating operation screens displayed on programmable displays. With regard to a programmable display, Patent Document 1 discloses an HMI that displays a plurality of objects such as buttons and text on an operation screen. A user can touch each of the objects displayed on the HMI and thereby can output commands associated with the objects to production equipment.

When an event such as an error occurs in production equipment, an operator copes with the error that has occurred in the production equipment while causing various screens such as a monitor screen for checking a state of the production equipment and an operation screen for the production equipment to be displayed on a programmable display. At that time, the operator is required to promptly respond to the error of the production equipment. Time taken to cope with the error can be shortened if screens needed by the operator can be quickly opened. Thus, a technology for promptly opening content including screens to be used to cope with an event such as an error has been desired.

PRIOR ART DOCUMENT

Patent Documents

[Patent Document 1] Japanese Patent Application Laid-Open (JP-A) No. 2016-506559.

SUMMARY

According to an aspect of the disclosure, a programmable display that can communicate with a controller that controls equipment includes a memory device for storing a plurality of pieces of content that can be used by the programmable display, a detection part for detecting a predetermined event that occurs in the equipment, a learning part for learning a first probability that each of the plurality of pieces of content will be used under a condition that the predetermined event occurs by monitoring content that is used by the programmable display when the predetermined event is detected, and a specification part for specifying content having a high possibility of being used by the programmable display among the plurality of pieces of content based on the learned first probability when the predetermined event is detected.

According to another aspect of the disclosure, a display control method of a programmable display that can communicate with a controller that controls equipment preferably includes a step of preparing a plurality of pieces of content that can be used by the programmable display, a step of detecting a predetermined event that occurs in the equipment, a step of learning a first probability that each of the plurality of pieces of content will be used under a condition that the predetermined event occurs by monitoring content that is used by the programmable display when the predetermined event is detected, and a step of specifying content having a high possibility of being used by the programmable display among the plurality of pieces of content based on the learned first probability when the predetermined event is detected.

According to still another aspect of the disclosure, a display control program of a computer that can communicate with a controller that controls equipment causes the computer to execute a step of preparing a plurality of pieces of content that can be used by the computer, a step of detecting a predetermined event that occurs in the equipment, a step of learning a first probability that each of the plurality of pieces of content will be used under a condition that the predetermined event occurs by monitoring content that is used by the computer when the predetermined event is detected, and a step of specifying content having a high possibility of being used by the computer among the plurality of pieces of content based on the learned first probability when the predetermined event is detected.

The above description and other objectives, features, aspects, and effects of the disclosure are clarified in the following detailed description of the disclosure that can be understood in association with the attached drawings.

DESCRIPTION OF THE EMBODIMENTS

In one or some of exemplary embodiments of the disclosure, the programmable display further includes a display. The learning part learns the first probability that each of the plurality of pieces of content will be displayed on the display under the condition that the predetermined event occurs by monitoring content displayed on the display when the predetermined event is detected. The programmable display further includes a display control part for causing a reference target of the specified content to be displayed on the display.

In one or some of exemplary embodiments of the disclosure, the display control part causes the content of the reference target to be displayed on the display based on the fact that a selection operation with respect to the reference target is received.

In one or some of exemplary embodiments of the disclosure, the display control part executes a preparation process for causing the specified content to be displayed on the display based on the fact that content having a high possibility of being displayed is specified by the specification part.

In one or some of exemplary embodiments of the disclosure, the display control part increases a display size of a reference target of content as the content has a higher value of the first probability.

In one or some of exemplary embodiments of the disclosure, the learning part further monitors types of errors that occur in the equipment due to an operation performed with respect to the programmable display, and thus to learn a second probability that each of errors will occur under a condition that a predetermined operation is performed with respect to the programmable display. In the case in which the predetermined operation is detected, the display control part causes a warning screen to be displayed on the display if a condition for which the second probability of each error is prescribed is satisfied.

In one or some of exemplary embodiments of the disclosure, the warning screen includes information indicating a type of an error having the second probability higher than a predetermined value.

In one or some of exemplary embodiments of the disclosure, the learning part learns the first probability with respect to each of users of the programmable display.

According to an aspect of the disclosure, it is possible to promptly use content for coping with an event that has occurred.

Embodiments of the disclosure will be described below with reference to the accompanying drawings. In the following description, the same reference signs are given to identical components and constituent elements. Names and functions thereof are also identical. Thus, detailed description thereof will not be repeated.

First Embodiment

[A. Overall Configuration of Information Processing System 1]

Figure 1:
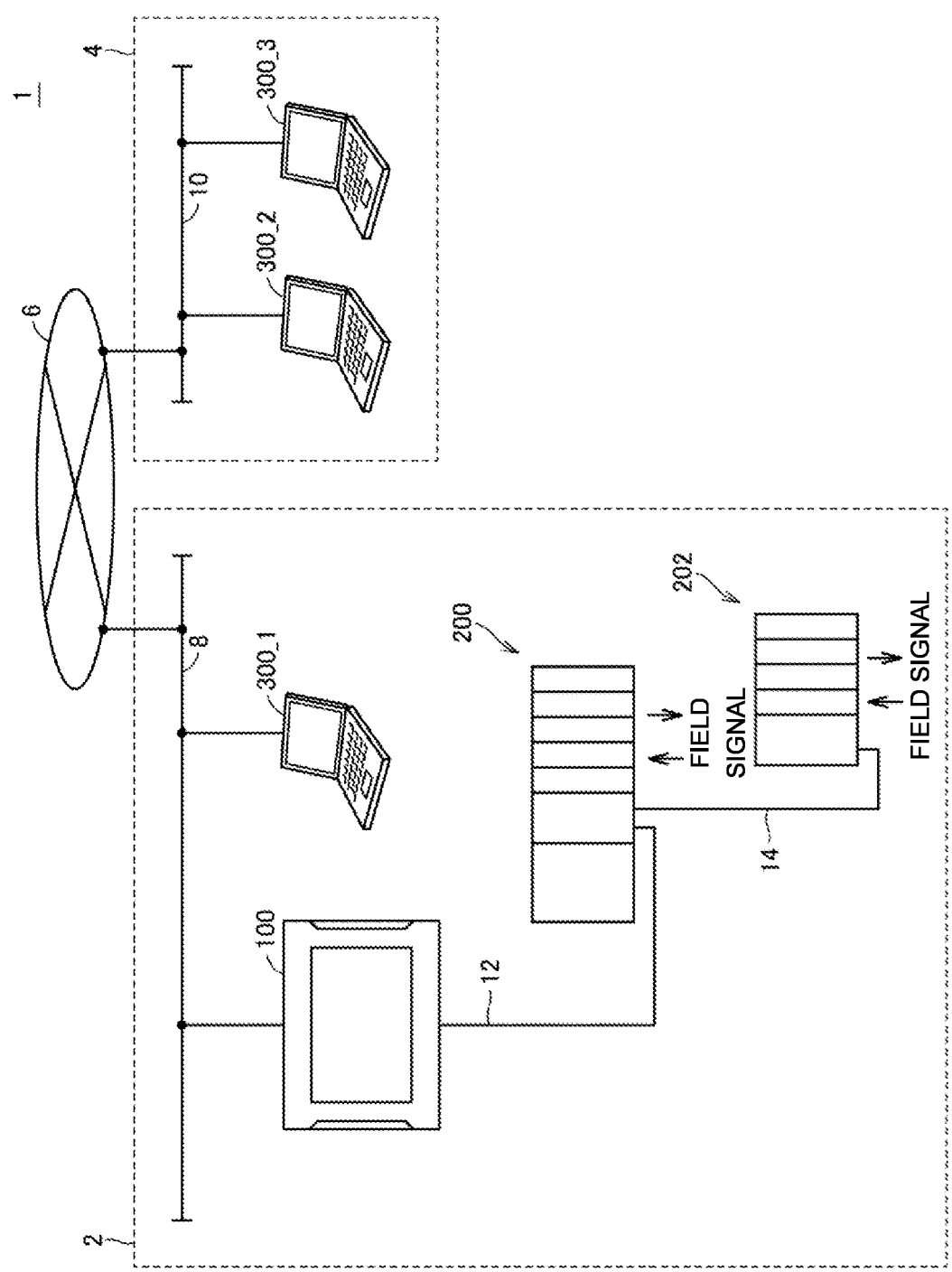
FIG. 1 is a schematic diagram showing an overall configuration of an information processing system according to a first embodiment of the disclosure.

First, an overall configuration of an information processing system 1 according to the present embodiment will be described. FIG. 1 is a schematic diagram showing an overall configuration of the information processing system according to the present embodiment. Referring to FIG. 1, the information processing system 1 includes a manufacturing field 2 in which manufacturing work is actually performed and a remote site 4 at which the manufacturing field 2 can be remotely viewed and operated. The manufacturing field 2 and the remote site 4 are assumed to be connected via an arbitrary network 6 (e.g., the Internet, a virtual private network (VPN), or the like). Note that it is preferable to set communication between the manufacturing field 2 and the remote site 4 to be secure, and typical techniques for encrypting data to be transmitted and received and/or for securing communication lines may be employed.

The manufacturing field 2 includes a controller 200 that controls a manufacturing device, a robot, and the like and a programmable display 100 that is connected to the controller 200 disposed therein.

The controller 200 is an industrial controller called a programmable logic controller (PLC) and controls production equipment to be controlled (e.g., manufacturing devices, robots, or the like), which is not illustrated, by exchanging field signals ((analog and/or digital) input signals detected by various sensors and (analog and/or digital) output signals to be given to various actuators) with the production equipment.

In the manufacturing field 2 illustrated in FIG. 1, the controller 200 is connected to a remote input/output (I/O) device 202 via a field bus 14. The remote I/O device 202 exchanges field signals with the production equipment to be controlled disposed at a position distant from the controller 200.

The programmable display 100 is connected to the controller 200 via a field bus 12, displays information held by the controller 200 to a user, and transfers internal commands to the controller 200 in accordance with an operation performed by the user. A human-machine interface (HMI) screen displayed on the programmable display 100 is designed to be created arbitrarily by a user, and is generally created to display a screen and information in accordance with the manufacturing field 2.

A display screen of the programmable display 100 can be created using external devices (which will be collectively referred to as "information processing devices" below). The external devices are not particularly limited as long as they are devices that can communicate with the programmable display 100 by any means, and for example, a personal computer, a smartphone, another programmable display, or the like can be used. As a scheme which enables communication with the programmable display 100, a known scheme including Universal Serial Bus (USB) communication, serial communication, parallel communication, wired network (e.g., Ethernet (a registered trademark)) communication, or wireless network (e.g., a wireless LAN, Bluetooth (a registered trademark)) communication can be used.

A personal computer is exemplified as the information processing device in the information processing system 1 of FIG. 1, and the personal computer is directly or indirectly connected to the programmable display 100 via a network. More specifically, an example in which an information processing device 300_1 connected to the programmable display 100 via a network 8 is disposed in the manufacturing field 2 and information processing devices 300_2 and 300_3 connected to the programmable display 100 via networks 6 and 10 are disposed in the remote site 4 is shown.

[B. Screen Display of Programmable Display 100]

Figure 2:
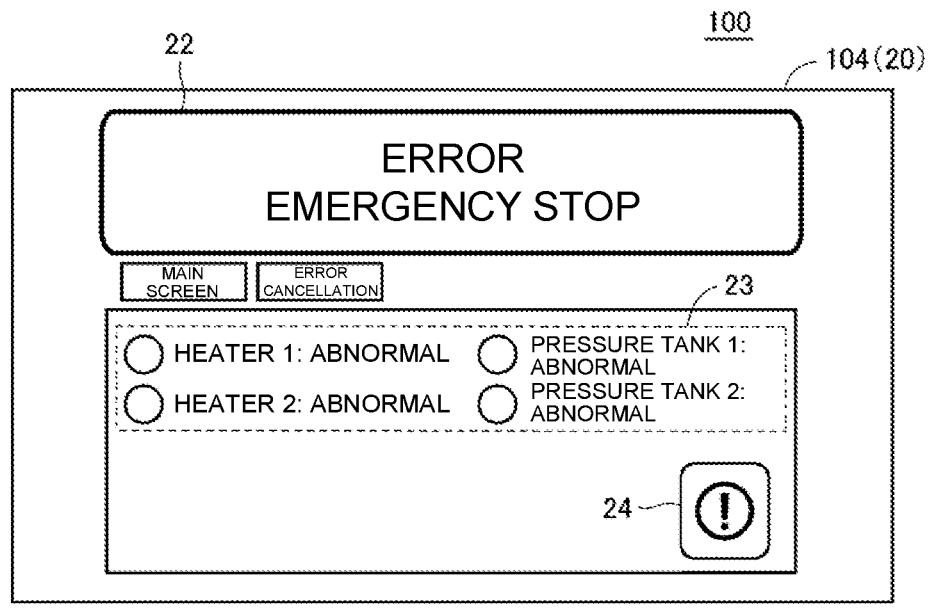
FIG. 2 is a diagram showing an example of a screen displayed by a programmable display according to the first embodiment.
Figure 2:
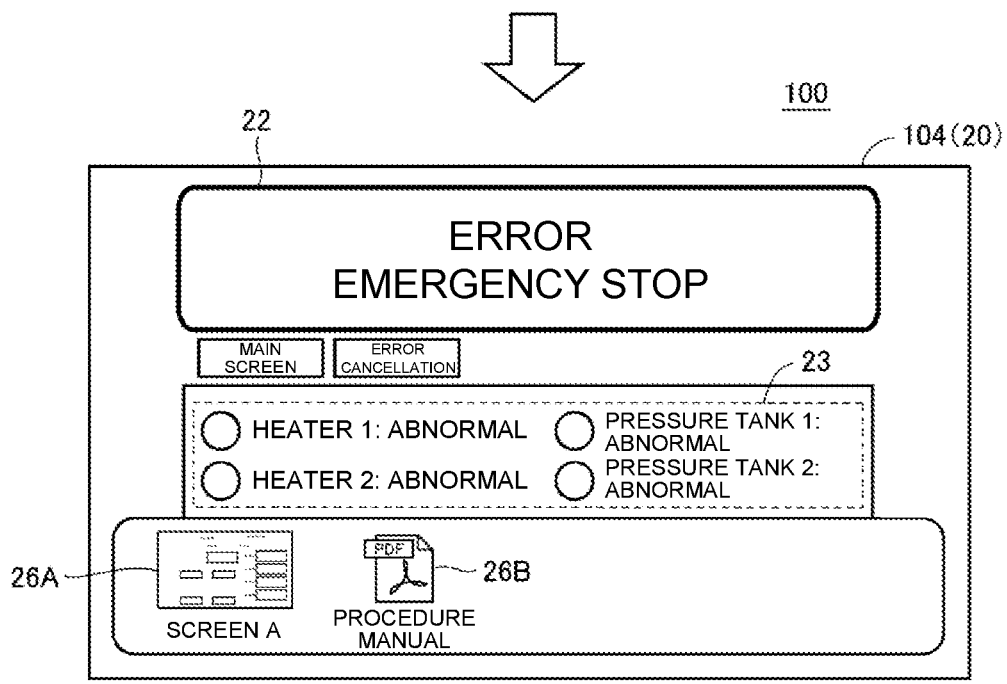

Screen display of the programmable display 100 will be described with reference to FIGS. 2 and 3. FIG. 2 is a diagram showing an example of a screen displayed by the programmable display 100.

The programmable display 100 displays an error screen 20 for giving a notification of an error when an event such as an error occurs in the production equipment controlled by the controller 200. The error screen 20 includes a warning message 22, detailed error information 23, and a button 24.

An operator checks the error screen 20 and copes with an error of the production equipment while causing various screens such as a monitor screen for checking a state of the production equipment, an operation screen of the production equipment, and the like to be displayed on the programmable display 100. At this time, if it takes time to switch the screens, a long period of time is necessary to cope with the error. Thus, the programmable display 100 according to the present embodiment learns a screen having a high probability of being displayed under a condition that an error to be notified of occurs and specifies content having a high probability of being used based on a result of the learning when another error of the same type occurs by monitoring content that is used when the error is detected.

A screen will be described below as an example of the content, however, content is not limited thereto. The content can also include, for example, files including portable document format (PDF) data, applications, and the like.

To exemplify a screen, the programmable display 100 learns a screen having a high probability of being displayed under the condition that an error to be notified of occurs by monitoring a screen displayed on a display 104 when the error is detected. Thereafter, when another error of the same type occurs, the programmable display 100 displays a reference target of the screen having the high probability of being displayed (which will also be referred to as a "display candidate screen" below) based on a result of the learning. Details of a learning process will be described below.

As an example, reference targets 26A and 26B are assumed to be specified as reference targets of display candidate screens. The programmable display 100 displays the specified reference targets 26A and 26B on the display 104 based on the fact that the button 24 is pressed. The reference targets 26A and 26B are displayed as, for example, shortcut icons. Alternatively, the reference targets 26A and 26B may be displayed with their addresses (file paths).

Preferably, the programmable display 100 displays the reference targets of the screens having higher probabilities of being displayed in more conspicuous modes. As an example, the programmable display 100 increases a display size of a reference target of a screen as the screen has a higher probability of being displayed. For example, in a case in which a display candidate screen of the reference target 26A has a higher possibility of being displayed than a display candidate screen of the reference target 26B, the programmable display 100 sets a display size of the reference target 26A to be bigger than a display size of the reference target 26B. Accordingly, the operator can easily specify a screen to be opened.

When an operator selects one of the reference targets 26A and 26B, a screen of the selected reference target is displayed on the display 104. By displaying the reference target 26A or 26B of the screen to be displayed in the event of an error, the operator can quickly open the screen to cope with the error and thus can promptly cope with the error.

Preferably, the programmable display 100 executes a preparation process (pre-processing) for displaying a display candidate screen on the display 104 based on the fact that the display candidate screen is specified. The preparation process includes, for example, preparing a display candidate screen at a rear of the error screen 20 currently displayed. An example of the preparation is illustrated in FIG. 3. FIG. 3 is a diagram showing a hierarchical relation of screens displayed on the display 104.

Figure 3:
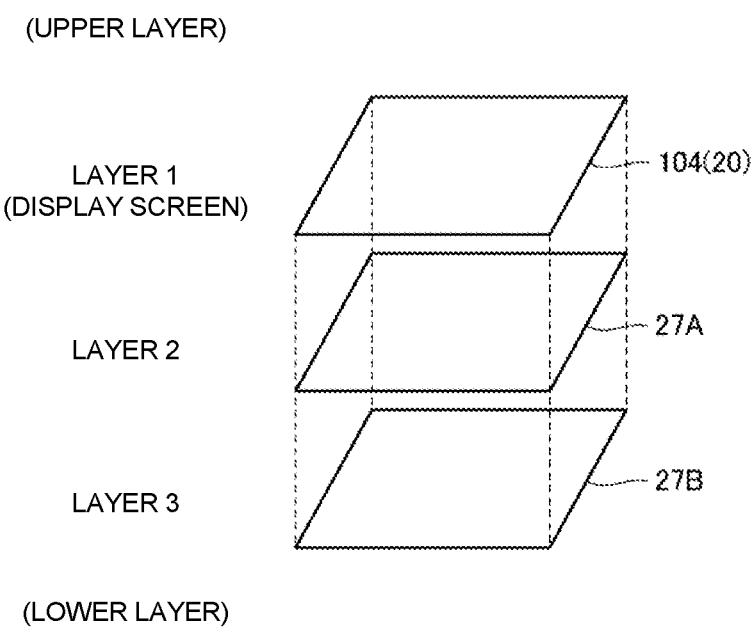
FIG. 3 is a diagram showing a hierarchical relation of screens displayed by the programmable display according to the first embodiment.

As illustrated in FIG. 3, the programmable display 100 prepares a display candidate screen 27A corresponding to the reference target 26A and a display candidate screen 27B corresponding to the reference target 26B at the rear of the error screen 20 currently displayed based on the fact that the display candidate screens are specified. The preparation process refers to, for example, creating the display candidate screens 27A and 27B and writing the screens in a cache memory or the like. By preparing the display candidate screens 27A and 27B at the rear of the error screen 20 as described above, a time for drawing taken to switch from the error screen 20 to the display candidate screens 27A and 27B is shortened.

Note that, although the process in which the display candidate screens 27A and 27B are prepared at the rear of the error screen 20 has been exemplified as the preparation process for displaying the display candidate screens as described above, another process may be performed as a preparation process. For example, the programmable display 100 may activate a viewer (e.g., a PDF viewer, or the like) for displaying the display candidate screens 27A and 27B as the preparation process. By activating a viewer in advance, a time for drawing taken to switch from the error screen 20 to the display candidate screens 27A and 27B can be shortened.

Preferably, the programmable display 100 executes the preparation process on display candidate screens having higher possibilities of being displayed in descending order. For example, in a case in which the display candidate screen 27A has a higher possibility of being displayed than the display candidate screen 27B, the programmable display 100 executes the preparation process with respect to the display candidate screen 27A earlier than the preparation process with respect to the display candidate screen 27B.

[C. Learning Process]

The programmable display 100 learns a screen having a high possibility of being displayed under the condition that an error occurs in production equipment by monitoring a screen displayed on the display 104 when the error is detected as described above. A learning process of the programmable display 100 will be described below. As an example, Bayes' theorem is used in the learning process as described in Expression (1) below.

$$P(Y|X)=P(X \wedge Y)/P(X)=P(X|Y) \cdot P(Y)/P(X) \qquad (1)$$

"X" and "Y" shown in Expression (1) each represent predetermined events. "P(X)" represents a probability that an event X will occur. "P(Y)" represents a probability that an event Y will occur. "P(Y|X)" represents a conditional probability that the event Y will occur under a condition that the event X occurs. "P(X|Y)" represents a conditional probability that the event X will occur under a condition that the event Y occurs. "P(X∧Y)" represents a probability that the events X and Y will occur at the same time.

In the present example, the event "X" represents an event in which a predetermined event has occurred and the event "Y" represents an even in which a predetermined screen has been displayed. That is, "P(Y|X)" represents a conditional probability that the predetermined screen will be displayed under a condition that the predetermined event occurs. The programmable display 100 uses a count table 124A shown in FIG. 4 to calculate the conditional probability "P(Y|X)."

Figure 4:
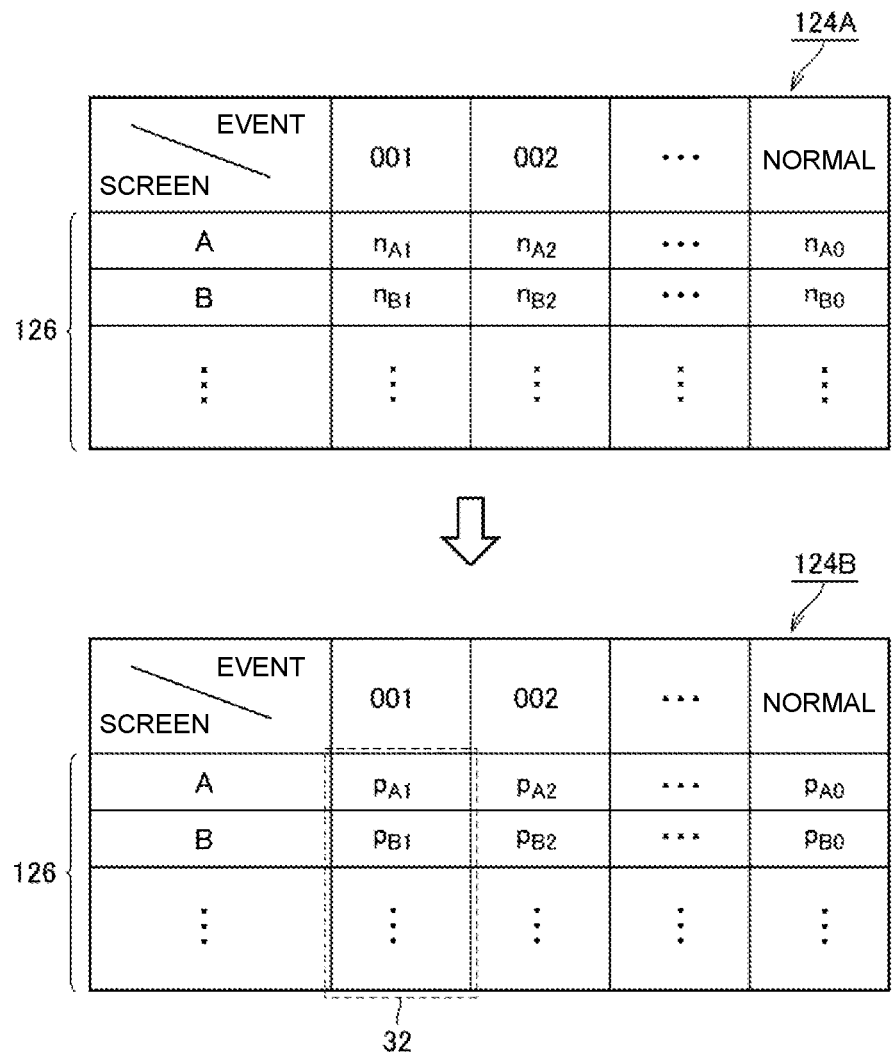
FIG. 4 is a diagram showing an example of a data structure of a count table according to the first embodiment.

FIG. 4 is a diagram showing an example of a data structure of the count table 124A. The programmable display 100 counts the number of screens displayed with respect to each of screens that can be displayed and types of events and writes the counted result numbers in the count table 124A. The count table 124A is updated, for example, each time a screen is switched. For example, display is assumed to have been switched to a screen "A." At this time, an event "001" is assumed to have occurred. In this case, the programmable display 100 increments a number "$n_{A1}$" which is associated with the screen "A" and the event "001." Preferably, the programmable display 100 executes an incrementing process only with respect to a screen displayed for a predetermined period of time or longer. Accordingly, screens that are instantly switched are not reflected in a counting result, and only screens displayed for a certain period of time are reflected in the counting result. That is, only screens that a user intends to display are reflected in the counting result.

The programmable display 100 generates a probability table 124B from the count table 124A. More specifically, the programmable display 100 calculates the sum of the counted numbers included in the count table 124A and divides each of the counted numbers by the sum. Accordingly, the probability of each screen being displayed when each event occurs is calculated as a learning result. The probability table 124B may be updated each time an event occurs, at each predetermined timing (e.g., every hour), or based on an updating operation performed by a user.

When a predetermined event is newly detected, the programmable display 100 calculates a conditional probability (a first probability) that each screen will be displayed under the condition that the predetermined event occurs with reference to the probability table 124B. The event "001" is assumed to have been detected as an example. In this case, the programmable display 100 calculates a total value of probabilities associated with the event "001" (i.e., a total of the dashed line part 32). The programmable display 100 calculates a conditional probability that the screen "A" will be displayed under the condition that the event "001" occurs by dividing a probability "$p_{A1}$" by the total value. Likewise, the programmable display 100 calculates a conditional probability with respect to another screen that the other screen will be displayed under the condition that the event "001" occurs.

The programmable display 100 specifies a screen having a high possibility of being displayed on the display 104 (i.e., a display candidate screen) among the screens based on the calculated conditional probabilities. Any method can be used to specify the screen in this case. As an example, the programmable display 100 may specify screens having calculated conditional probabilities exceeding a predetermined value as display candidate screens. Alternatively, the programmable display 100 may specify a predetermined number of screens having calculated highly ranked conditional probabilities as display candidate screens.

Note that, although the learning process to which the Bayes' theorem is applied has been described above, another process may be employed. For example, a neural network, deep learning of support vector machines, or other kinds of machine learning may be employed.

[D. Functional Configuration]

Figure 5:
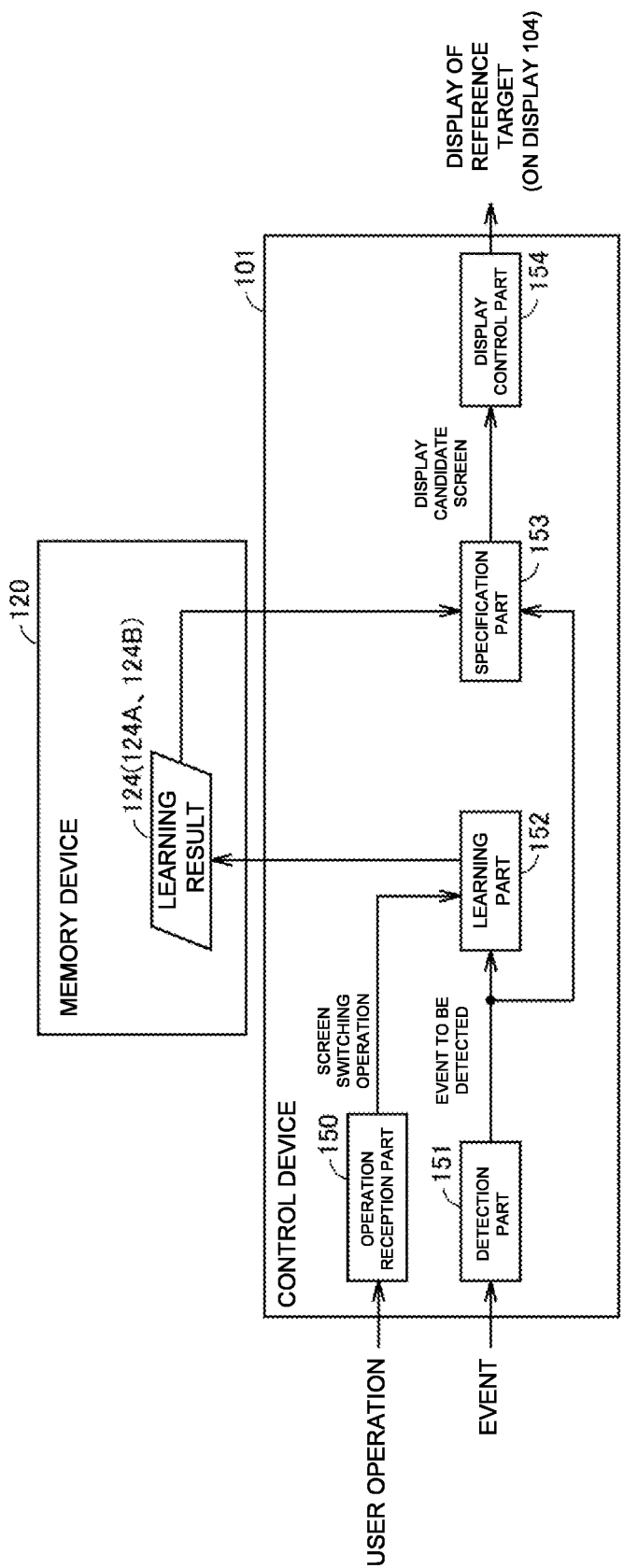
FIG. 5 is a diagram showing an example of a functional configuration of the programmable display according to the first embodiment.

A functional configuration of the programmable display 100 will be described with reference to FIG. 5. FIG. 5 is a diagram showing an example of a functional configuration of the programmable display 100.

The programmable display 100 includes a control device 101 and a memory device 120 as a main hardware configuration as shown in FIG. 5. The control device 101 includes an operation reception part 150, a detection part 151, a learning part 152, a specification part 153, and a display control part 154 as an example of the functional configuration.

The operation reception part 150 receives a user operation with respect to the programmable display 100. As an example, the operation reception part 150 receives a user operation from a mouse connected to the programmable display 100 or a touch panel provided on the display 104 (refer to FIG. 2). When an operation of switching a screen of the display 104 has been received, the operation reception part 150 outputs the operation to the learning part 152.

The detection part 151 monitors events that may occur in the production equipment to be controlled and detects a predetermined event. An event to be detected may be registered in advance or arbitrarily set by a user. The event to be detected may not only be an event explicitly indicating an error of the production equipment but may also be an event implying an error of the production equipment. When the predetermined event to be detected is detected, the detection part 151 outputs the fact to the learning part 152.

The learning part 152 learns a conditional probability that each screen will be displayed under the condition that an event to be detected occurs by monitoring a screen displayed on the display 104 when the event is detected. A learning method used by the learning part 152 is as described in the section [C. Learning process] above, and thus description thereof will not be repeated. The learning part 152 writes calculated conditional probabilities in a learning result 124. The learning result 124 includes the count table 124A and the probability table 124B described above.

The specification part 153 specifies a screen having a high probability of being displayed (i.e., a display candidate screen) when the event to be detected occurs based on a conditional probability prescribed in the learning result 124 when the event is detected. As an example, the specification part 153 specifies screens having conditional probabilities exceeding a predetermined value as display candidate screens. Alternatively, the programmable display 100 may specify a predetermined number of screens having calculated highly ranked conditional probabilities as display candidate screens. The specified display candidate screens are output to the display control part 154.

The display control part 154 causes reference targets of the specified display candidate screens to be displayed on the display 104 (refer to FIG. 2). At this time, the display control part 154 causes the reference targets of the display candidate screens having higher probabilities of being displayed to be displayed in a more conspicuous mode. As an example, the display control part 154 may increase a display size of a reference target as the display candidate screen thereof has a higher probability of being displayed. Alternatively, the display control part 154 may cause a reference target to be displayed in a more conspicuous color (e.g., red) if the display candidate screen thereof has a higher probability of being displayed. Alternatively, the display control part 154 may cause a reference target to be displayed darker if the display candidate screen thereof has a higher probability of being displayed.

The display control part 154 causes a screen of the selected reference target to be displayed on the display 104 based on the fact that a selection operation with respect to the displayed reference target has been received. Accordingly, the operator can quickly open a screen to be used to cope with the event that has occurred in the production equipment and thus can promptly cope with the error and the like.

Preferably, the display control part 154 executes a preparation process for causing the display candidate screens to be displayed on the display 104 based on the fact that the display candidate screens have been specified by the specification part 153. Accordingly, a time for drawing taken to select the reference targets of the display candidate screens can be shortened and thus the operator can cope with the error more promptly.

[E. Control Structure]

Figure 6:
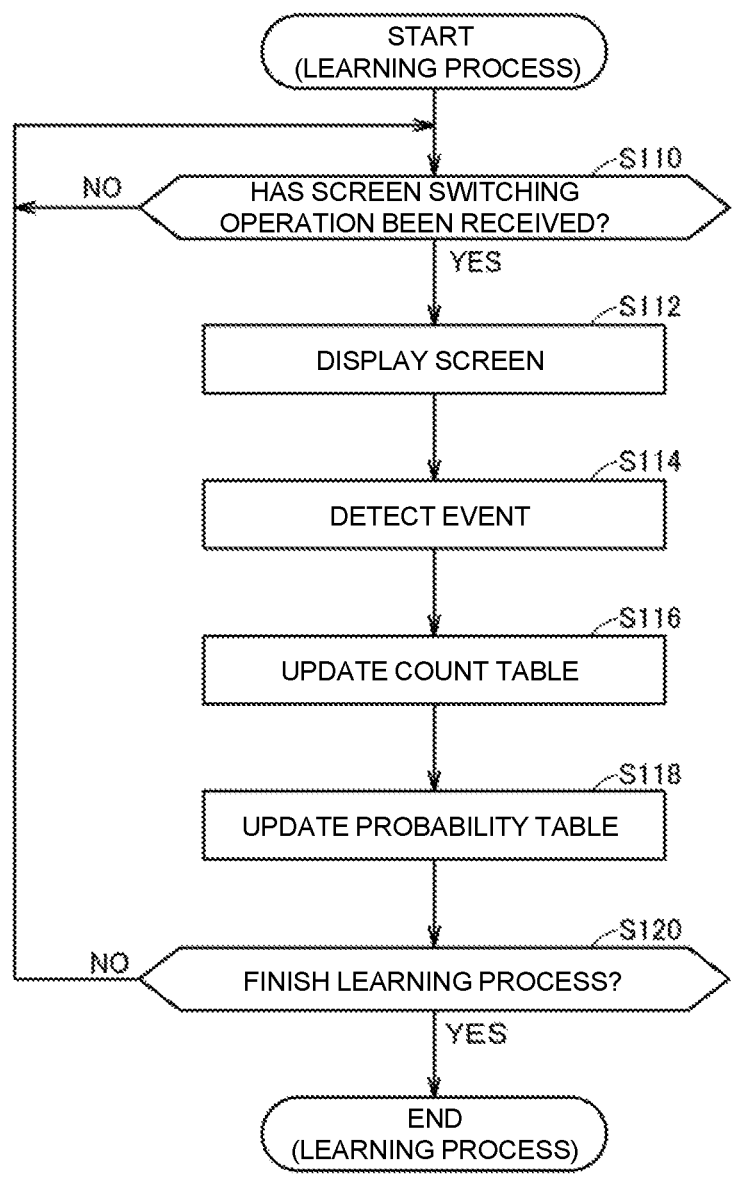
FIG. 6 is a flowchart showing a learning process executed by the programmable display according to the first embodiment.
Figure 7:
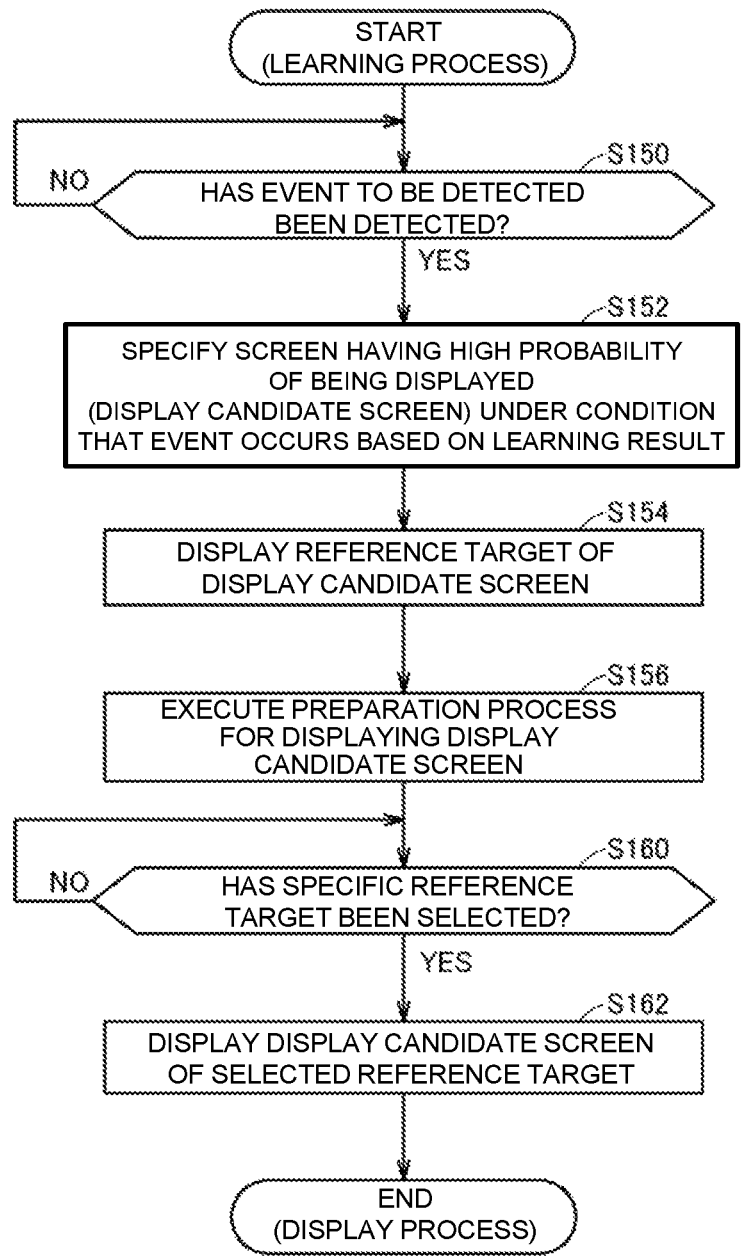
FIG. 7 is a flowchart showing a display process executed by the programmable display according to the first embodiment.

A flow of the above-described learning process and a flow of a display process of displaying the above-described reference targets of the display candidate screens will be described with reference to FIGS. 6 and 7. FIG. 6 is a flowchart showing the above-described learning process. FIG. 7 is a flowchart showing the display process of displaying the above-described reference targets of the display candidate screens. The processes shown in FIGS. 6 and 7 are realized by the control device 101 (refer to FIG. 5) of the programmable display 100 when the control device executes a program. In another aspect, the processes may be partly or entirely executed using a circuit element or other hardware.

(E1. Flow of Learning Process)

First, a flow of the above-described learning process will be described with reference to FIG. 6.

In Step S110, the control device 101 determines whether a screen switching operation has been received from a user. If the screen switching operation is determined to have been received from a user (YES in Step S110), the control device 101 switches control to Step S112. If not (NO in Step S110), the control device 101 executes the process of Step S110 again.

In Step S112, the control device 101 causes the above-described display control part 154 (refer to FIG. 5) to display a screen designated in Step S110 on the display 104 of the programmable display 100.

In Step S114, the control device 101 causes the above-described detection part 151 (refer to FIG. 5) to detect an event that has currently occurred in the controller 200 (refer to FIG. 1) which controls the production equipment.

In Step S116, the control device 101 increments the number of screens displayed associated with the screen displayed in Step S112 and the event detected in Step S114 based on the above-described count table 124A (refer to FIG. 4).

In Step S118, the control device 101 causes the above-described learning part 152 (refer to FIG. 5) to generate the probability table 124B (refer to FIG. 4) from the count table 124A. The method for generating the probability table 124B is as described above in the section [C. Learning process], and thus description thereof will not be repeated.

In Step S120, the control device 101 determines whether the learning process is to be finished. As an example, the control device 101 determines whether the learning process is to be finished based on the fact that a learning process end operation is received from the user. If the learning process is determined to be finished (YES in Step S120), the control device 101 finishes the process of FIG. 6. If not (NO in Step S120), the control device 101 returns the control to Step S110.

(E2. Flow of Display Process)

Next, a flow of the display process of displaying reference targets of display candidate screens based on the learning result will be described with reference to FIG. 7.

In Step S150, the control device 101 determines whether an event to be detected has been detected using the above-described detection part 151 (refer to FIG. 5). If an event to be detected is determined to have been detected (YES in Step S150), the control device 101 switches control to Step S152. If not (NO in Step S150), the control device 101 executes the process of Step S150 again.

In Step S152, the control device 101 specifies a screen having a high probability of being displayed (i.e., a display candidate screen) when the event detected in Step S150 occurs using the above-described specification part 153 (refer to FIG. 5) based on the conditional probability prescribed according to the learning result obtained in the learning process of FIG. 6. As an example, the control device 101 specifies screens having conditional probabilities exceeding a predetermined value as display candidate screens. Alternatively, the control device 101 specifies a predetermined number of screens having calculated highly ranked conditional probabilities as display candidate screens.

In Step S154, the control device 101 causes the above-described display control part 154 (refer to FIG. 5) to display a reference target of each display candidate screen specified in Step S152 on the display 104 of the programmable display 100. The reference target may be expressed with, for example, a simplified shortcut icon of the display candidate screen, or an address (a file path) of the display candidate screen.

In Step S156, the control device 101 executes the preparation process for displaying each display candidate screen specified in Step S152. For example, the preparation process includes preparing the display candidate screen at a rear of a currently displayed (stand-by) screen. In addition, the control device 101 may execute an activation process of a viewer (e.g., a PDF viewer or the like) for displaying the display candidate screen as the preparation process.

In Step S160, the control device 101 determines whether a specific reference target has been selected from the reference targets displayed in Step S154. If a specific reference target is determined to have been selected (YES in Step S160), the control device 101 switches control to Step S162. If not (NO in Step S160), the control device 101 executes the process of Step S160 again.

In Step S162, the control device 101 causes the above-described display control part 154 to display the display candidate screen of the reference target selected in Step S160.

[F. Hardware Configuration of Programmable Display 100]

Figure 8:
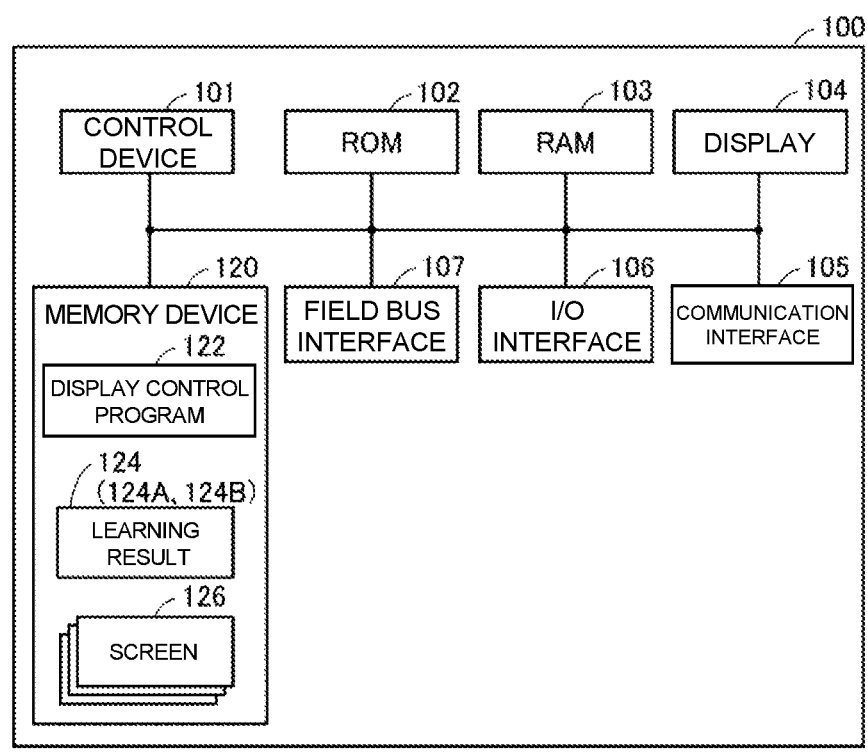
FIG. 8 is a block diagram showing a main hardware configuration of the programmable display according to the first embodiment.

An example of a hardware configuration of the programmable display 100 will be described with reference to FIG. 8. FIG. 8 is a block diagram showing a main hardware configuration of the programmable display 100.

The programmable display 100 includes the control device 101, a read only memory (ROM) 102, a random access memory (RAM) 103, the display 104, a communication interface 105, an I/O interface 106, a field bus interface 107, and a memory device 120 as illustrated in FIG. 8.

The control device 101 controls the programmable display 100. The control device 101 is configured by, for example, at least one integrated circuit. The integrated circuit is configured by, for example, at least one central processing unit (CPU), at least one application specific integrated circuit (ASIC), at least one field programmable gate array (FPGA), or a combination thereof.

The control device 101 controls operations of the programmable display 100 by executing various programs such as a display control program 122. The control device 101 reads the display control program 122 from the memory device 120 to the ROM 102 based on the fact that an execution command of the display control program 122 has been received. The RAM 103 functions as a working memory and temporarily stores various kinds of data necessary for executing the display control program 122.

The display 104 is, for example, a liquid crystal display, an organic electro-luminescence (EL) display, or another display device. The display 104 is provided on a touch panel and receives various operations with respect to the programmable display 100 through touch operations.

The communication interface 105, the I/O interface 106, and the field bus interface 107 mediate exchange of data between the programmable display 100 and an external device. More specifically, the communication interface 105 mediates communication with the information processing device via the network 8 (refer to FIG. 1) or the like. A component that can perform communication in accordance with Ethernet, for example, can be employed as the communication interface 105. The I/O interface 106 mediates communication with various users and interface devices (e.g., a keyboard, a mouse, and the like). A component that can perform USB communication or serial communication, for example, can be employed as the I/O interface 106. The field bus interface 107 mediates exchange of data with the controller 200. A component that can perform communication in accordance with EtherCAT (a registered trademark) may be employed as the field bus interface 107, or a component that can perform communication in accordance with Ethernet may be employed, like the communication interface 105.

The memory device 120 is a memory medium, for example, a flash memory. As an example, the memory device 120 stores data including the display control program 122 of the programmable display 100, a learning result 124 (the count table 124A and the probability table 124B) obtained from the above-described learning process, a screen 126 that can be displayed on the display 104, and the like. A storage place of the display control program 122, the learning result 124, and the screen 126 is not limited to the storage device 120, and the data may be stored in a memory area (e.g., a cache memory, or the like) of the control device 101, the ROM 102, the RAM 103, an external device (e.g., the controller 200, the information processing device, a server), or the like.

Note that the display control program 122 may be provided as a single program or may be incorporated into a part of an arbitrary program. In this case, the processes of the present embodiment are realized in cooperation with an arbitrary program. Even if the program does not include some modules, the program does not depart from the gist of the display control program 122 of the present embodiment. Furthermore, some or all of the functions provided by the display control program 122 may be realized through hardware. Moreover, the display control program 122 may be configured to be realized by the programmable display 100, the controller 200, and the information processing device in cooperation. In addition, the programmable display 100 may be configured in the form of a so-called cloud computing service in which at least one server executes a part of processes of the display control program 122.

[G. Summary of First Embodiment]

As described above, the programmable display 100 according to the first embodiment learns probabilities of screens to be displayed under a condition that an event to be detected occurs by monitoring a screen displayed on the display 104 when the event occurs. When the event to be detected is detected, the programmable display 100 specifies a screen having a high possibility of being displayed on the display 104 (i.e., a display candidate screen) based on the probabilities calculated in the learning process and causes a reference target of the display candidate screen to be displayed. The programmable display 100 causes the display candidate screen of the selected reference target to be displayed on the display 104 based on the fact that a selection operation with respect to the reference target is received.

Since the reference target of the screen having the high possibility of being displayed is displayed in accordance with the event that has occurred, an operator can quickly open screens for coping with the event. As a result, it is possible to promptly cope with the event. In addition, a display mistake of screens can be prevented.

Second Embodiment

[A. Overview]

Figure 9:
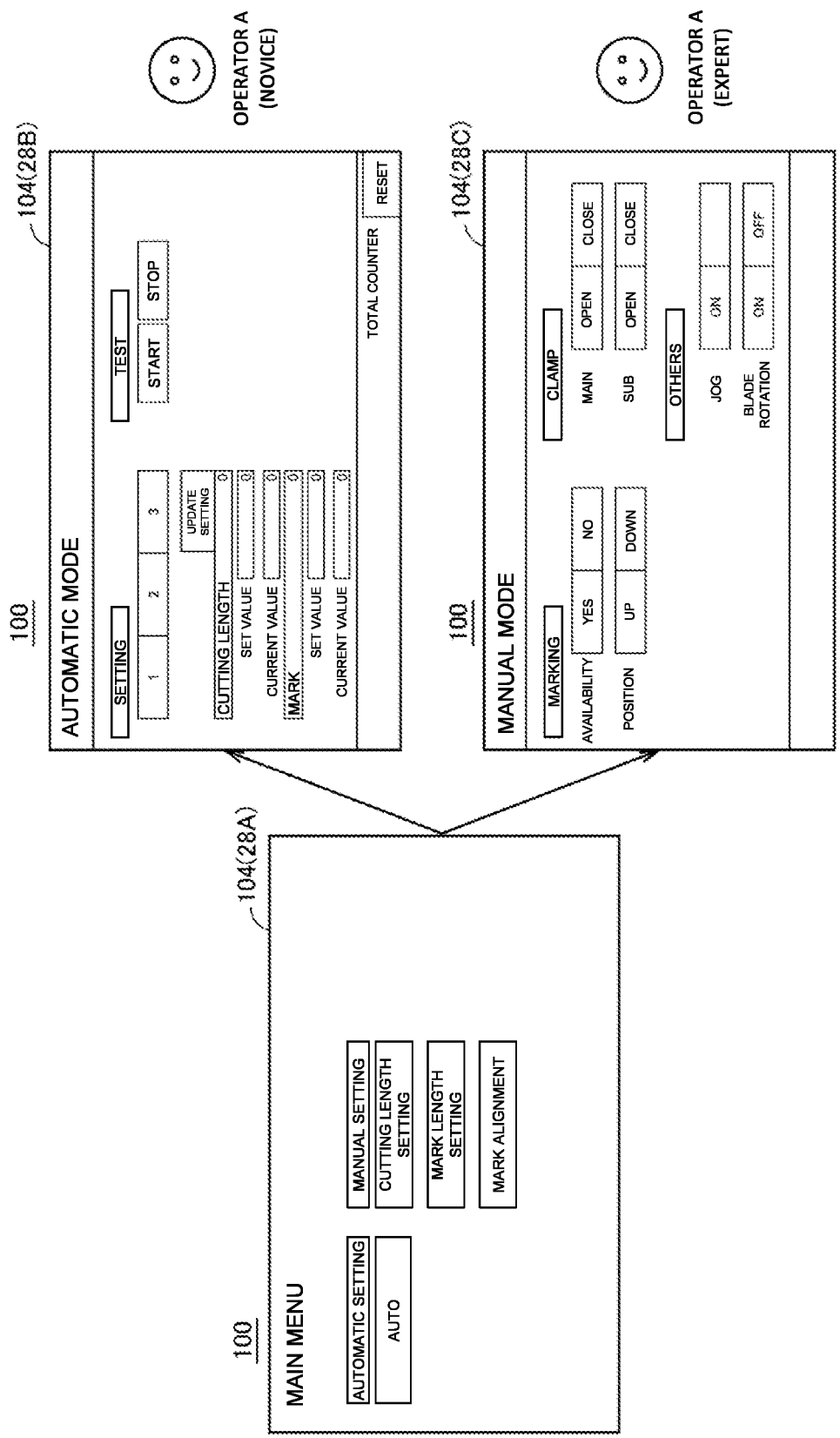
FIG. 9 is a diagram showing an example of a screen transition of the programmable display according to the first embodiment.

An overview of a programmable display 100 according to a second embodiment will be described with reference to FIG. 9. FIG. 9 is a diagram showing an example of a screen transition of the programmable display 100.

Screens to be displayed when an event occurs differ depending on users. For example, operators having insufficient experience tend to cause a screen for controlling production equipment in an automatic mode to be displayed in order to cope with an event that has occurred in an automated manner. In the example of FIG. 9, a novice operator "A" performs switching from a main screen 28A to an automatic mode screen 28B. On the other hand, operators having rich experience tend to cause a screen for controlling production equipment in a manual mode to be displayed in order to cope with an error by themselves. In the example of FIG. 9, an expert operator "B" performs switching from the main screen 28A to a manual mode screen 28C. As described above, probabilities of screens being displayed in the event of an error differ depending on users.

Thus, the programmable display 100 according to the second embodiment executes the above-described learning process with respect to each of users. Accordingly, such a learning result 124 (refer to FIG. 5) is obtained for each of the users. When an event to be detected is detected, the programmable display 100 specifies a learning result 124 corresponding to a current user and specifies a screen having a high possibility of being displayed (i.e., a display candidate screen) based on the learning result 124.

Since other configurations of the programmable display 100 are the same as that of the first embodiment, description thereof will not be repeated below.

[B. Screen Display of Programmable Display 100]

Figure 10A:
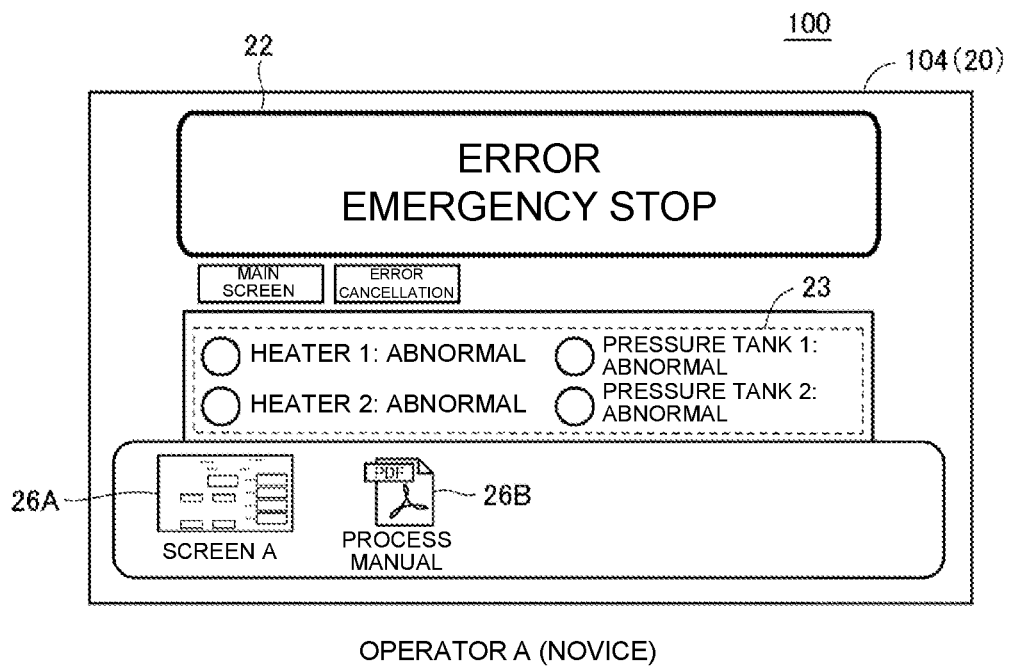
FIGS. 10A and 10B are diagrams showing examples of a screen displayed by a programmable display according to a second embodiment of the disclosure.
Figure 10B:
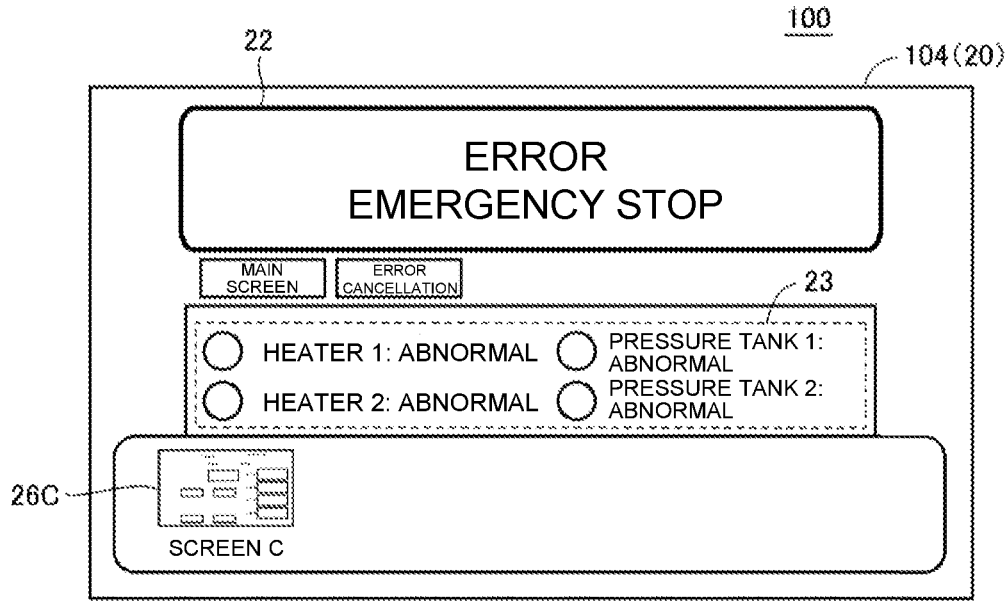

Screen display of the programmable display 100 according to the second embodiment will be described with reference to FIGS. 10A, 10B and 11. FIGS. 10A and 10B are diagrams showing examples of a screen displayed by the programmable display 100 according to the second embodiment.

In the present embodiment, the above-described learning result 124 is prepared for each of users. The programmable display 100 identifies a current user when an event to be detected has been detected. As an example, a user is identified using user information of a user who has logged on to the programmable display 100. Alternatively, identification of a user is realized using a face authentication technology. The programmable display 100 specifies a learning result 124 corresponding to the current user and specifies a reference target of a screen having a high possibility of being displayed (i.e., a display candidate screen) to cope with a current event based on the learning result 124.

As an example, the reference targets 26A and 26B are assumed to be specified as reference targets of display candidate screens for the novice operator "A." As a result, the programmable display 100 causes the reference targets 26A and 26B to be displayed on the display 104 as illustrated in FIG. 10A. On the other hand, a reference target 26C is assumed to be specified as a reference target of a display candidate screen for the expert operator "B." As a result, the programmable display 100 causes the reference target 26C to be displayed as illustrated in FIG. 10B. As described above, the reference targets of the screens suitable for users are displayed when the learning process is executed for each of the users.

Preferably, the programmable display 100 executes a preparation process (pre-processing) for causing the display candidate screens to be displayed on the display 104 based on the fact that the display candidate screens have been specified. The preparation process includes, for example, preparing the display candidate screens at a rear of a currently displayed error screen 20. An example of the preparation is illustrated in FIG. 11. FIG. 11 is a diagram showing a hierarchical relation of screens displayed on the display 104.

Figure 11:
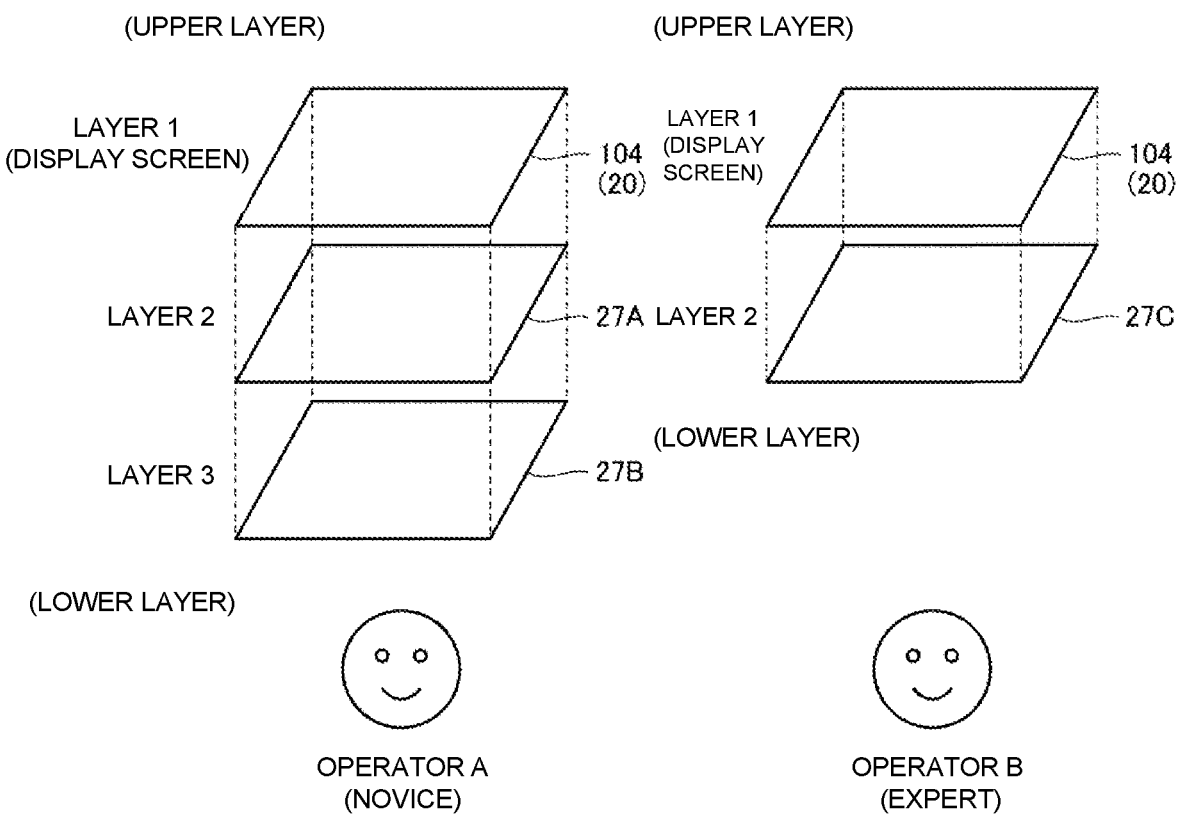
FIG. 11 is a diagram showing a hierarchical relation of screens displayed on a display of the programmable display according to the second embodiment.

The programmable display 100 prepares a display candidate screen 27A corresponding to the reference target 26A and a display candidate screen 27B corresponding to the reference target 26B at the rear of the error screen 20 currently displayed for the novice operator "A" as illustrated in FIG. 11. On the other hand, the programmable display 100 prepares a display candidate screen 27C corresponding to the reference target 26C at the rear of the currently displayed error screen 20 for the expert operator "B."

Note that, although the example in which the display candidate screens are displayed at the rear of the error screen 20 as the preparation process has been described in FIG. 11, the preparation process is not limited thereto. For example, in a case in which the programmable display 100 has learned a relation between a predetermined event and an application to be used when the event occurs, the programmable display 100 activates an application having a high possibility of use on a background when the event has occurred. Accordingly, a preparation process for using the application is performed.

[C. Summary of Second Embodiment]

As described above, the programmable display 100 according to the present embodiment learns probabilities of screens to be displayed when an event occurs with respect to each of users. When an event is detected, the programmable display 100 specifies a screen having a high probability of being displayed based on a learning result corresponding to a current user and causes a reference target of the screen to be displayed. Accordingly, the reference target of the screen having the high possibility of being displayed is displayed in accordance with the user.

Third Embodiment

[A. Overview]

The programmable display 100 according to the first embodiment estimates a screen having a high possibility of being displayed when an event occurs by learning a relation between the event that has occurred and a screen to be displayed. Meanwhile, a programmable display 100 according to a third embodiment estimates an error having a high possibility of occurrence when a predetermined user operation is performed by learning a relation between the user operation and the error that may occur due to the user operation. Accordingly, occurrence of errors can be prevented beforehand.

Since other configurations of the programmable display 100 are the same as that of the first embodiment, description thereof will not be repeated below.

[B. Learning Process]

The Bayes' theorem shown in Expression (1) above is used in a learning process as described above. In the first embodiment, the event "X" shown in Expression (1) represents an event in which a predetermined event has occurred and the event "Y" represents an even in which a predetermined screen has been displayed. In the present embodiment, however, the event "X" shown in Expression (1) represents an event in which a predetermined user operation has been performed and the event "Y" represents an event in which a predetermined error has occurred. That is, "P(Y|X)" shown in Expression (1) represents a conditional probability that the predetermined error will occur under the condition that the predetermined user operation is performed. The programmable display 100 uses a count table 124C shown in FIG. 12 to calculate the conditional probability "P(Y|X)."

Figure 12:
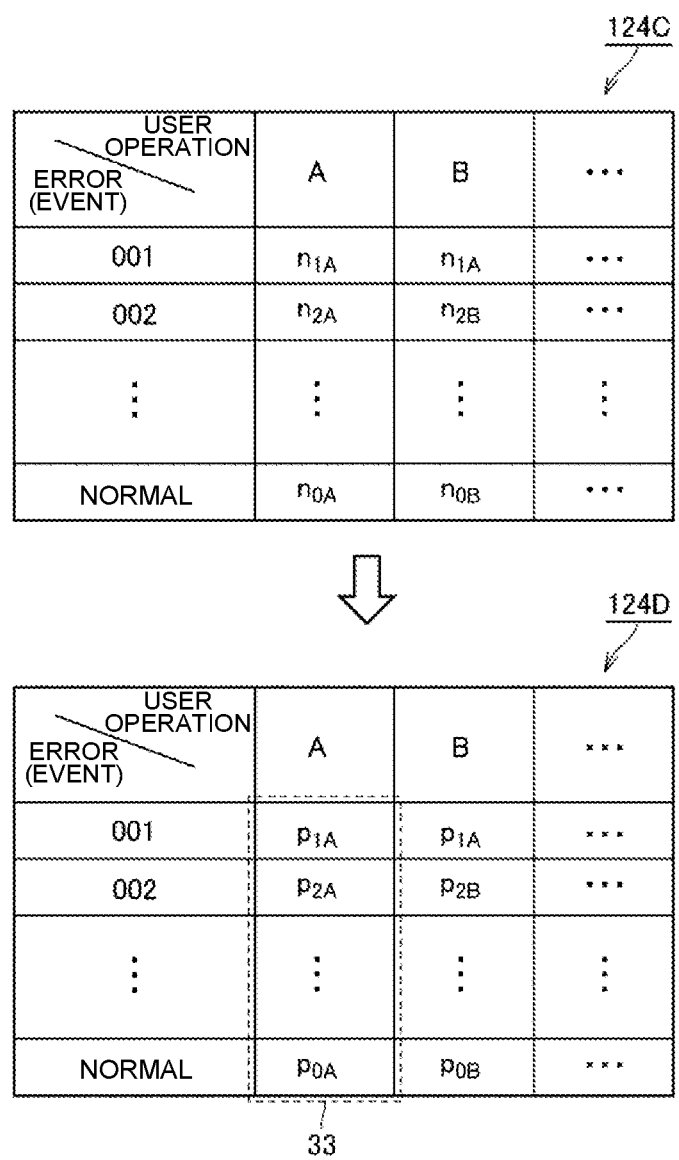
FIG. 12 is a diagram showing an example of a data structure of a count table according to the second embodiment.

FIG. 12 is a diagram showing an example of a data structure of the count table 124C. The programmable display 100 counts the number of errors that may occur with respect to each type of error and each type of user operation and writes a result of the counting into the count table 124C. The count table 124C is updated, for example, each time a predetermined user operation is detected. User operations to be detected may be set by a user or set in advance. As an example, operations to be detected include an operation of consecutively pressing a predetermined button, an input operation with respect to a predetermined input item, and other predetermined operation patterns.

A user operation "A" is assumed to have been detected, for example. At this time, an error "001" is assumed to occur after a predetermined period of time. In this case, the programmable display 100 increments a counted number "n1A" corresponding to the user operation "A" and the error "001." In this manner, the programmable display 100 monitors user operations and increments a counted number corresponding to an error that may occur after a predetermined period of time when a predetermined user operation has been detected.

The programmable display 100 generates a probability table 124D from the count table 124C. More specifically, the programmable display 100 calculates the sum of counted numbers included in the count table 124C and divides each of the counted numbers by the sum. Accordingly, each probability of an error occurring after a user operation is performed is calculated as a learning result. The probability table 124D may be updated each time a user operation to be detected is detected, updated each time an error to be detected occurs, updated at a predetermined timing (e.g., every hour), or updated based on an updating operation of a user.

The programmable display 100 calculates a conditional probability that an error will occur (a second probability) under a condition that a predetermined user operation is performed when the predetermined user operation is newly detected with reference to the probability table 124D. As an example, the user operation "A" is assumed to have been detected. In this case, the programmable display 100 calculates a total value of probabilities associated with the user operation "A" (i.e., the total of the dashed line part 33). The programmable display 100 calculates the conditional probability that the error "001" will occur under the condition that the user operation "A" is performed by dividing a probability "p1A" by the total value. Likewise, the programmable display 100 calculates a conditional probability with respect to another error that the other error will occur under the condition that the user operation "A" is performed.

The programmable display 100 displays a warning screen on the display 104 when a condition for which a conditional probability calculated for each error is prescribed is satisfied. As an example, the condition is satisfied when at least one of calculated conditional probabilities is higher than a predetermined value (e.g., 90%). Alternatively, the condition is satisfied when an average value of the calculated conditional probabilities is higher than a predetermined value (e.g., 50%).

Figure 13:
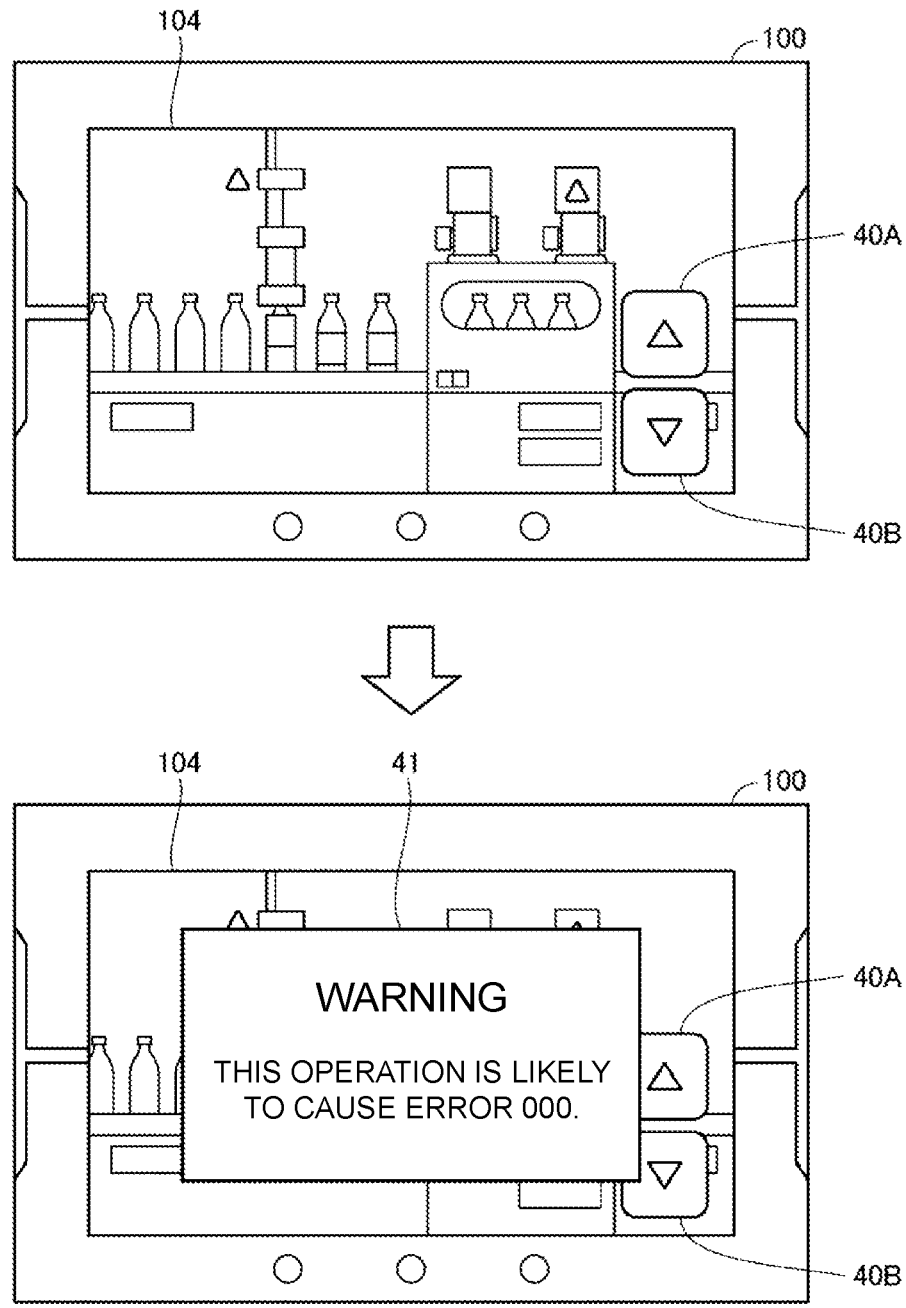
FIG. 13 is a diagram showing an example of a warning screen displayed when a predetermined user operation is detected.

FIG. 13 is a diagram showing an example of a warning screen displayed when a predetermined user operation is detected. The display 104 shown in FIG. 13 is display of a button 40A for increasing a product transport speed in production equipment and a button 40B for decreasing the transport speed. A user is assumed to repeatedly press the button 40A on this screen. At this time, a user operation of consecutively pressing the button 40A is assumed to have a calculated conditional probability exceeding the predetermined value. As a result, the programmable display 100 displays a warning screen 41. Accordingly, the programmable display 100 can prevent occurrence of an error beforehand.

Preferably, the warning screen 41 includes identification information indicating a type or error of which the calculated conditional probability is higher than the predetermined value. In the example of FIG. 13, an error number "000" is displayed as identification information of an error. By displaying the identification information of the error, a user can ascertain the error having a high possibility of occurrence at a glance.

More preferably, the warning screen 41 includes information for identifying a type of user operation performed with respect to the programmable display 100.

Note that, although the example in which the event "X" of Expression (1) indicates an event in which a predetermined user operation is performed and the event "Y" indicates an event in which a predetermined error occurs has been described above, an event to be learned is not limited thereto. For example, an event to be learned may be a time (e.g., shift, night/afternoon/morning, spring/summer/fall/winter, or an annual event), a continuous operation time, control data (a control parameter), or the like. Alternatively, an event to be learned may be control data (e.g., an event) of a PLC. As described above, relations between various events to be learned are learned by changing the events. In addition, the number of learned events is not limited to two and a relation between three or more events may be learned.

[C. Summary of Third Embodiment]

As described above, the programmable display 100 according to the third embodiment learns a probability of each error occurring under the condition that a predetermined user operation is performed by monitoring the type of the error caused by the user operation in production equipment. In a case in which a predetermined user operation to be detected has been detected, the programmable display 100 displays a warning screen when a condition for which an error occurrence probability calculated for each error is prescribed is satisfied. Accordingly, the programmable display 100 can prevent the error caused by the user operation beforehand.

All aspects of the embodiments disclosed above are mere examples and are not limitative. The scope of the disclosure is clarified in the claims rather than the above description, and modifications thereof made within meanings and scopes equivalent to those of the claims are also included therein.

What is claimed is:

1. A programmable display that can communicate with a controller that controls equipment, comprising:
    a memory device for storing a plurality of pieces of content that can be used by the programmable display;
    a processor coupled to the memory device and configured to:
    detect a predetermined event that occurs in the equipment;
    learn a first probability of each of the plurality of pieces of content by monitoring content that is used by the programmable display when the predetermined event is detected, wherein the processor executes an incrementing process to generate a counting result when a screen is switched from other screens and being displayed for equal to or longer than a predetermined period of time and the processor learns the first probability based on the counting result; and
    specify content having a high possibility of being used by the programmable display among the plurality of pieces of content based on the learned first probability when the predetermined event is detected, wherein the learned first probability of each of the plurality of pieces of content is obtained, and content having the learned first probability higher than a predetermined value is specified as the content, comprising a first content and a second content, having the high possibility of being used by the programmable display; and
    a display control part, coupled to the processor, configured to execute a preparation process before the first content and the second content to be displayed on a display, wherein the preparation process comprises preparing a first candidate screen corresponding to the first content and a second candidate screen corresponding to the second content at a rear of an error screen being displayed by activating a viewer corresponding to the first candidate screen and a viewer corresponding to the second candidate screen, wherein the viewer corresponding to the first candidate screen and the viewer corresponding to the second candidate screen comprise a PDF viewer being used to view a PDF document, wherein the second candidate screen has less possibility to be displayed than the first candidate screen,
    wherein the display control part is configured for causing a first reference target corresponding to the first content and a second reference target corresponding to the second content to be displayed on the display and causing the first candidate screen and the second candidate screen to be displayed on the display based on a fact that a selection operation with respect to the first reference target or the second reference target is received, wherein the display control part executes the preparation process with respect to the first candidate screen earlier than the preparation process with respect to the second candidate screen.

2. The programmable display according to claim 1, wherein the processor learns the first probability that each of the plurality of pieces of content will be displayed on the display by monitoring content displayed on the display when the predetermined event is detected.

3. The programmable display according to claim 2, wherein the display control part increases a display size of a reference target of content as the content has a higher value of the first probability.

4. The programmable display according to claim 2,
wherein the processor further monitors types of errors that occur in the equipment due to an operation performed with respect to the programmable display, and thus to learn a second probability that each of the errors will occur under a condition that a predetermined operation is performed with respect to the programmable display, and wherein, in the case in which the predetermined operation is detected, the display control part causes a warning screen to be displayed on the display if a condition for which the second probability of each error is prescribed is satisfied.

5. The programmable display according to claim 4, wherein the warning screen includes information indicating a type of an error having the second probability higher than a predetermined value.

6. The programmable display according to claim 1, wherein the processor learns the first probability with respect to each of users of the programmable display.

7. A display control method of a programmable display that can communicate with a controller that controls equipment, the display control method comprising:
   a step of preparing a plurality of pieces of content that can be used by the programmable display;
   a step of detecting a predetermined event that occurs in the equipment;
   a step of learning a first probability of each of the plurality of pieces of content by monitoring content that is used by the programmable display when the predetermined event is detected, wherein an incrementing process is executed to generate a counting result when a screen is switched from other screens and being displayed for equal to or longer than a predetermined period of time and the first probability is learned based on the counting result;
   a step of specifying content having a high possibility of being used by the programmable display among the plurality of pieces of content based on the learned first probability when the predetermined event is detected, wherein the learned first probability of each of the plurality of pieces of content is obtained, and content having the learned first probability higher than a predetermined value is specified as the content, comprising a first content and a second content, having the high possibility of being used by the programmable display;
   a step of executing a preparation process before the first content and the second content to be displayed on a display, wherein the preparation process comprises preparing a first candidate screen corresponding to the first content and a second candidate screen corresponding to the second content at a rear of an error screen being displayed by activating a viewer corresponding to the first candidate screen and a viewer corresponding to the second candidate screen, wherein the viewer corresponding to the first candidate screen and the viewer corresponding to the second candidate screen comprise a PDF viewer being used to view a PDF document, wherein the second candidate screen has less possibility to be displayed than the first candidate screen; and
   a step of causing a first reference target corresponding to the first content and a second reference target corresponding to the second content to be displayed on the display and causing the first candidate screen and the second candidate screen to be displayed on the display based on a fact that a selection operation with respect to the first reference target or the second reference target is received,
   wherein the preparation process with respect to the first candidate screen is executed earlier than the preparation process with respect to the second candidate screen.

8. A non-transitory computer-readable recording medium comprising a display control program of a computer that can communicate with a controller that controls equipment, the display control program causing the computer to execute:
   a step of preparing a plurality of pieces of content that can be used by the computer;
   a step of detecting a predetermined event that occurs in the equipment;
   a step of learning a first probability of each of the plurality of pieces of content by monitoring content that is used by the computer when the predetermined event is detected, wherein an incrementing process is executed to generate a counting result when a screen is switched from other screens and being displayed for equal to or longer than a predetermined period of time and the first probability is learned based on the counting result;
   a step of specifying content having a high possibility of being used by the computer among the plurality of pieces of content based on the learned first probability when the predetermined event is detected, wherein the learned first probability of each of the plurality of pieces of content is obtained, and content having the learned first probability higher than a predetermined value is specified as the content, comprising a first content and a second content, having the high possibility of being used by the computer;
   a step of executing a preparation process before the first content and the second content to be displayed on a display, wherein the preparation process comprises preparing a first candidate screen corresponding to the first content and a second candidate screen corresponding to the second content at a rear of an error screen being displayed by activating a viewer corresponding to the first candidate screen and a viewer corresponding to the second candidate screen, wherein the viewer corresponding to the first candidate screen and the viewer corresponding to the second candidate screen comprise a PDF viewer being used to view a PDF document, wherein the second candidate screen has less possibility to be displayed than the first candidate screen; and
   a step of causing a first reference target corresponding to the first content and a second reference target corresponding to the second content to be displayed on the display and causing the first candidate screen and the second candidate screen to be displayed on the display based on a fact that a selection operation with respect to the first reference target or the second reference target is received, wherein the preparation process with respect to the first candidate screen is executed earlier than the preparation process with respect to the second candidate screen.

* * * * *